Patented Aug. 16, 1938

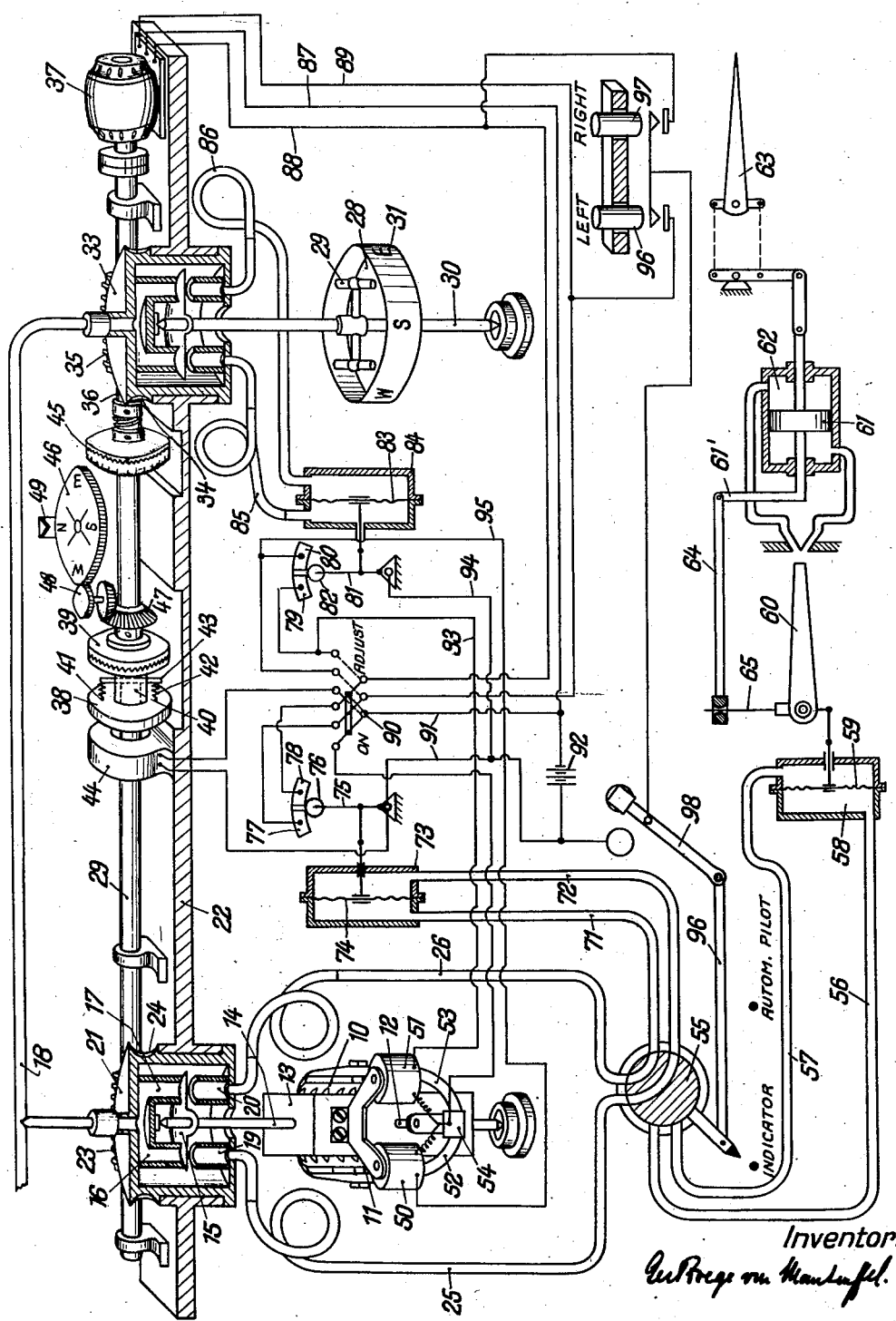

2,126,935

UNITED STATES PATENT OFFICE 2,126,935

DIRECTION MAINTAINING MEANS FOR USE ON DIRIGIBLE CRAFT

Gert Zoege von Manteuffel, Berlin-Dahlem, Germany, assignor to Askania-Werke A. G. vormals Centralwerkstatt-Dessau und Carl Bamberg-Friedenau, a corporation of Germany Application June 30, 1937, Serial No. 151,309
In Germany July 2, 1936

7 Claims. (Cl. 33—222)

This invention relates to direction maintaining means, and its object is an improvement of devices of the character disclosed in the copending application entitled "Direction maintaining means for use on dirigible craft" filed July 29, 1936, Ser. No. 93,307.

Devices of the kind disclosed in said copending application are more particularly designed for use on dirigible craft for indicating true direction or as baseline for automatic steering and comprise a free gyroscope and a directional or compass instrument, each provided with a positional controller. The controllers are rotatably mounted on the craft and connected for equiangular movement. The controller of the directional instruments controls by means of suitable torque exerting means the position of the gyroscope, while the controller of the latter insures the maintenance of a predetermined relative position between the controllers and the craft. To this end the controller either actuates a motor for maintaining the controllers fixed in space, in case the instrument functions as indicator, or the controller actuates an automatic steering device to maintain the craft together with the controllers in a predetermined direction. In the latter case the device functions as baseline for automatic steering.

It may now happen that upon starting of the gyroscope the position of its controller is not in phase with the controller of the directional instrument, which may be a magnetic compass. Since the latter is arranged to correct the position of the gyroscope to maintain both controllers in phase, a torque will be exerted on the gyroscope to restore the normal relation. Inasmuch as the gyroscope precesses only slowly, considerable time is spent until the proper positional relation is attained. This may be of disadvantage if the device is mounted on an airplane and required to indicate and steer true directions immediately upon taking off.

It is therefore an object of this invention to provide means for immediately restoring the proper initial phase relation of the controllers upon starting of the operation of device.

Other aims, objects and advantages of this invention will appear from a consideration of the description which follows with the accompanying drawing showing for purely illustrative purposes an embodiment of this invention. It is to be understood, however, that the description is not to be taken in a limiting sense, the scope of this invention being defined in the appended claims.

Referring to the drawing:

The figure is a partly perspective and partly diagrammatic illustration of an embodiment of this invention applied to a control of the course direction.

A free or azimuth gyroscope is shown as comprising a gyro rotor 10 mounted for spinning in a rotor bearing frame 11 which is free to oscillate about a horizontal axis 12 in a vertical or azimuth frame 13. The azimuth frame is free to turn about a vertical axis 14 and actuates a controller or positional pick-off, in the example shown as being of the pressure fluid type, disclosed in the patent to Wunsch 1,729,850 dated October 1, 1929.

The controller includes a primary member, a disk 15, rotatable with the azimuth frame of the gyroscope and intercepting flows of pressure fluid issuing from a pair of ports 16 and 17 supplied with pressure fluid, such, as air through a conduit 18. Oppositely to the ports 16 and 17 a second pair of ports 19 and 20 is positioned in which differential pressures are set up depending on the relative coverage and uncoverage of the ports. The ports are fixedly positioned in a casing 21 and form the secondary member of the controller. The casing is rotatable in azimuth in a fixed support 22 of the craft, a worm 23 and wormwheel 24 being shown for this purpose.

It appears from the foregoing that a differential pressure impulse will be created in impulse conduits 25 and 26 upon a relative movement of the gyroscope and the craft, or the gyroscope and the casing 21, respectively. The neutral position in which the pressures in conduits 25 and 26 become equal, may accordingly be adjusted by turning the casing 21.

For correcting the position of the gyroscope a directional instrument is provided, in the example shown as being a magnet compass 28. The type of compass disclosed in the above mentioned Patent 1,729,850 may preferably be used for this purpose.

It is to be understood, however, that the position of the gyroscope may also be corrected from a wireless directional system in place of a compass, such system being described in the Patent 1,896,805 to Elmer A. Sperry dated February 6, 1933.

The compass 28 comprises a magnet system 29 rotatable about a vertical axis 30 and may be additionally provided with a compass card 31. The magnet system operates a controller similar to the one described in connection with the gyroscope. The casing 33 of the controller is also rotatable with regard to the support 22 by means of a gear 34 and worm 35 secured to the shaft 36 and driven by a reversible motor 37.

The shafts 29 and 36 to which the worms 24 and 35 are secured are connected by means of a clutch 38 permitting an adjustment of the phase relation of the controllers. The clutch is shown as comprising a first disk 39 secured to the shaft 36 and a movable disk member 40 mounted for axial movement on the other shaft 29 and maintained in engagement with the first disk 39 by means of springs 41 and 42 arranged between the disk member 40 and a pin 43 extending through the shaft 29. The friction surfaces of the disk and disk member may be milled as shown in the drawing for increasing the friction. A solenoid 44 is provided for operating the clutch by attacting the disk member 40.

For additionally introducing a phase correction between the controllers a manually operable device 45 may be provided as also disclosed in said copending application. The latter clutch permits the gyroscope to assume a correct position relatively to the true magnetic North direction under local conditions causing the compass to deviate from the true magnetic direction.

The position of the casing 21 in azimuth may be read on an indicator disk 46 operated from the shaft 36 over a gear train 47, 48. The indicator disk is provided with a reference mark 49 fixed relatively to the craft.

The gyroscope is equipped with a pair of torque applying solenoids 50, 51 fixed to the azimuth frame 13. Cooperating therewith, there is fixed to the horizontal axis 12 of the rotor bearing member 11 a pair of oppositely disposed iron cores 52, 53 secured to an arm 54. Said cores partially enter the solenoid windings so that when a greater E. M. F. is impressed upon one solenoid than on the other a torque will be applied about the horizontal axis 12 to precess the gyroscope.

There is further provided a change-over valve 55 from which one pair of conduits 56, 57 extend to a diaphragm casing 58 with a diaphragm 59 controlling the position of a jet-pipe 60 of a steering device of the type shown and described in the Patent 1,967,156 to Moller, dated July 17, 1934. The jet-pipe is supplied with pressure fluid from a source (not shown) and controls the position of the piston 61 of a servo-motor 62 for operating a rudder 63. A restoring connection is also provided which is shown in the example as including a rigid arm 61', a link 64 and a flat spring 65 tending after initial displacement to move the jet-pipe into the neutral position.

A second pair of conduits 71, 72 to which the controller 21 may be connected, leads to a diaphragm casing 73 the diaphragm 74 of which operates a switch. The said switch comprises a contact arm 75 and roller 76 which normally rests on a narrow strip of insulating material separating segments 77 and 78 of conducting material.

A similar switch comprising segments 79 and 80, and an arm 81 with a roller 82 is operated from a diaphragm 83 inclosed in a casing 84 and acted upon by the differential pressure in conduits 85 and 86 of the compass controller.

The reversible motor 37 is controlled over three lines 87, 88, and 89 leading to an adjusting switch 90 for connection, alternatively, with the controllers 75 and 81. For normal operation the switch is in the left or "on" position, while for adjusting the device the switch is moved to the right, "adjust", position in which the solenoid 44 of the clutch is connected in a circuit 91 to a battery 92 common for all circuits.

In the "on" position the compass controls the torque applying solenoids 52 and 53 by means of its switch 81 and a circuit including lines 93, 94, and 95. The gyroscope, in turn, controls with its switch 75 the reversible motor 37 when the change-over valve 55 is in the indicator position. Accordingly the casing 33 of the compass controller will assume a definite position relatively to the controlling segment and thus remain fixed in space. When the gyroscope and the compass are precisely in phase there will be no differential pressure impulse to actuate the switch 81 and the torque applying solenoids will not be excited. If, for some reason, the gyroscope should deviate from the proper and compass-controlled position, the controller casing 33 will cause a controlling impulse to be created. The switch 81 is moved accordingly and one of the solenoids 52 and 53 excited to exert a torque on the gyroscope to precess the same into the proper position for establishing an equal phase relation between the controllers.

When the change-over valve 55 is moved into the right or "automatic pilot" position, the jet-pipe relay 60 and the servo-motor 61 is actuated. The ship will accordingly be steered in such a direction that the ship connected controller casings 21 and 33 at all times follow the position of the compass and gyroscope which remain fixed in space. In other words, the ship is steered a straight course.

For changing course the neutral position of the controllers has to be readjusted. For this purpose push buttons 96 and 97 are shown which also control the motor 37 over lines 88 and 89. The push buttons are automatically connected in the circuit by moving the change over valve 55 into the "automatic pilot" position. A connecting and disconnecting switch 98 connected to be moved together with the change-over valve 55, 96 is shown for this purpose.

The operation of the device, so far described is also set forth in the copending application Ser. No. 93,307 of July 29, 1936.

It may now be assumed that the device is about to be started, the gyroscope being at rest and the compass and the gyroscope having assumed out of phase positions. The mode of adjusting the phase relation of the device disclosed in the said copending application will accordingly be the following, assuming for simplicity's reason that the valve 55 be in the "indicator" position. The gyroscope by means of its controller will cause the motor 37 to turn the controller casings 21 and 33 and the indicator 46 into a wrong position. The compass thereupon detects the incorrectness of the phase relation, sets up an impulse in controller 33 and causes the gyroscope to precess into the proper and compass controlled position. The motor 37 will according to the precessional movement of the gyroscope be turned in the opposite direction until after some time the proper phase relation is restored. The indicator 46 which has been moved first to indicate the incorrect position of the gyroscope will slowly approach the correct indicating position.

Inasmuch as the precessional movements of the gyroscope are slow, considerable time elapses until the device is in the proper working condition. Assuming the change-over valve be in the "automatic pilot" position, it is easily seen that the steering device will be operated in phase with the motor 37 and the ship be steered in a wrong direction until the gyroscope has precessed into the proper direction or position.

In order to eliminate the time delay the present invention provides means for moving the controllers into the proper phase relation without the necessity of precessing the gyroscope.

Assuming again, that the gyroscope be in a position out of phase with the directional instrument, the mode of operation of the improved device is as follows, provided the change-over valve 55 be in the indicator position:

When the device is started the adjusting switch is moved into the left, or "on" position. The impulse of the gyroscope controller will now cause the motor to turn the shafts 29 and 36. When the gyroscope controller has been moved into its neutral position the motor stops and the indicator 49 will now indicate a wrong course. As the compass controller 33 was by this movement moved out of its neutral position it begins to cause slow precessional movements of the gyroscope. The switch 90 is now moved to the right into the "adjust" position thereby cutting off the torque solenoids 50 and 51 which have their common terminal connected to the contact of the switch farthest to the left. In the "adjust" position the solenoid 44 of the clutch is excited, causing the clutch to separate the shafts 29 and 36. The motor 37 being now controlled by the compass controller 33 and the switch 81 associated therewith the compass controller is moved into the neutral position. When the motor 37 stops, the controllers are in phase and upon moving the switch 90 into the "on" position again, the device operates in the usual hereinbefore described manner.

Obviously the present invention is not restricted to the particular embodiment herein shown and described and permitting various modifications within the scope of the invention.

I claim:

1. Direction maintaining means for craft comprising, in combination, a free gyroscope; a first controller governed by the relative position of the craft and said gyroscope; a directional instrument; a second controller governed by the relative position of the craft and said instrument; means controlled by the second controller for correcting the gyroscope; means connecting both controllers for equiangular rotation; a motor controlled by said first controller and adapted to actuate said connecting means; and a clutch interposed in said rotating means for disconnecting said controllers, whereby only one controller may be turned by the motor for initial adjustment to the relative position of the other controller.

2. Direction maintaining means for craft comprising, in combination, a free gyroscope; a first controller governed by the relative position of the craft and said gyroscope; a directional instrument; a second controller governed by the relative position of the craft and said instrument; means controlled by said second controller for causing the gyroscope to turn into predetermined azimuthal portion with respect to said instrument; means connecting both controllers for equiangular rotation; a motor for actuating said connecting means; a change-over switch for alternatively connecting said motor to one or the other of said controllers; a clutch interposed in said rotating means for disconnecting said controllers; and means for opening said clutch upon connecting of said motor to said second controller, whereby only one controller is turned by the motor for adjustment to the relative position of the other controller.

3. Direction maintaining means as set forth in claim 2 in which additionally means are provided for rendering inoperative said gyroscope correcting means upon connecting of said motor to said second controller.

4. Direction maintaining means for craft comprising, in combination, a directional gyroscope; a controller governed by the relative position of the craft and said gyroscope, said controller comprising a primary gyroscope actuated element and a secondary craft connected element; a magnetic compass; a second controller governed by the relative position of the craft and said compass, said second controller comprising a primary compass actuated element and a secondary craft connected element; means controlled by said second controller for causing said gyroscope to turn into predetermined azimuthal position with respect to said instrument; means connecting the secondary elements for equiangular rotation; a motor controlled by said first controller and connected to actuate said connecting means; and a clutch interposed in said connecting means for disconnecting said secondary elements, whereby only one secondary element may be turned by the motor for initial adjustment of the respective controller to the relative position of the other controller.

5. Direction maintaining means for craft comprising, in combination, a directional gyroscope; a controller governed by the relative position of the craft and said gyroscope, said controller comprising a primary gyroscope actuated element and a secondary craft connected element; a magnetic compass; a second controller governed by the relative position of the craft and said compass, said second controller comprising a primary compass actuated element and a secondary craft connected element; means controlled by said second controller for causing said gyroscope to turn into predetermined azimuthal position with respect to said instrument; means connecting the secondary elements for equiangular rotation; a motor controlled by said first controller and connected to actuate said connecting means; a change-over switch for alternatively connecting said motor to one or the other of said controllers; a clutch interposed in said connecting means for disconnecting said controllers; and means for opening said clutch upon connecting of said motor to said second controller, whereby only one secondary element may be turned by the motor for initial adjustment of the respective controller to the relative position of the other controller.

6. Direction maintaining means as set forth in claim 5 in which additionally means are provided for rendering inoperative said gyroscope correcting means upon connecting of said motor to said second controller.

7. Direction maintaining means for craft comprising, in combination, a directional gyroscope; a controller governed by the relative position of the craft and said gyroscope, said controller comprising a primary gyroscope actuated element and a secondary craft connected element; a magnetic compass; a second controller governed by the relative position of the craft and said compass, said second controller comprising a primary compass actuated element and a secondary craft connected element; means for exerting a corrective torque on said gyroscope, said torque exerting means being controlled by said second controller; a worm and gear drive for equiangular rotating said secondary elements in azimuth including a common driving shaft to which said worms are secured; power means to rotate said shaft, said power means being controlled by the relative turning of the primary and secondary elements of said first controller; a change-over switch for alternatively connecting said power means to one or the other of said controllers; a clutch interposed in said shaft for disconnecting said controllers; and means for opening said clutch upon connecting of said power means to said second controller.

GERT ZOEGE von MANTEUFFEL.